United States Patent [19]
Foster

[11] Patent Number: 5,447,222
[45] Date of Patent: Sep. 5, 1995

[54] PLASTIC FLOOR SLAT FOR RECIPROCATING CONVEYOR

[76] Inventor: Raymond K. Foster, P.O. Box 1, Madras, Oreg. 97741

[21] Appl. No.: 306,829

[22] Filed: Sep. 15, 1994

[51] Int. Cl.⁶ .............................................. B65G 25/04
[52] U.S. Cl. .................................................. 198/750.2
[58] Field of Search ....................... 198/750; 414/525.1

[56] References Cited

U.S. PATENT DOCUMENTS

| | | | |
|---|---|---|---|
| 4,727,978 | 3/1988 | Hallstrom, Jr. ............... | 198/750 X |
| 4,749,075 | 6/1988 | Foster ........................... | 198/750 |
| 4,896,761 | 1/1990 | Foster ........................... | 198/750 |
| 4,984,679 | 1/1991 | Foster ........................... | 198/750 |
| 5,088,595 | 2/1992 | Hallstrom, Jr. ............... | 198/750 |
| 5,193,661 | 3/1993 | Foster ........................... | 198/750 |
| 5,238,360 | 8/1993 | Foster ........................... | 198/750 X |
| 5,267,641 | 12/1993 | Hallstrom, Jr. ............... | 198/750 |
| 5,301,798 | 4/1994 | Foster ........................... | 198/750 |
| 5,323,894 | 6/1994 | Quaeck ......................... | 198/750 |
| 5,335,778 | 8/1994 | Wilkens ........................ | 198/750 |
| 5,346,056 | 9/1994 | Quaeck ......................... | 198/750 |
| 5,355,994 | 10/1994 | Foster ........................... | 198/750 |

*Primary Examiner*—James R. Bidwell
*Attorney, Agent, or Firm*—Joan H. Pauly

[57] ABSTRACT

A plastic floor slat for use in a reciprocating slat conveyor includes a lower bearing and a side bearing integrated into the slat body. The lower bearing is positioned to contact an upper surface of a guide beam on which the slat is mounted to directly and slidably support the slat on the beam. This enables the elimination of a bearing as a separate component. The side bearings contact seals carried by adjacent floor slats. At least the upper surface portion of the top of the slat is reinforced for providing a highly wear resistant upper load bearing surface. Preferably, all the portions of the slat except the seal are co-extruded to integrally form the slat body.

24 Claims, 1 Drawing Sheet

PLASTIC FLOOR SLAT FOR RECIPROCATING CONVEYOR

TECHNICAL FIELD

This invention relates to plastic floor slats for reciprocating conveyors and, more particularly, to a floor slat that has a lower bearing surface for slidably supporting the slat on a guide beam and a side bearing surface for engaging a seal carried by an adjacent floor slat, and that is preferably integrally co-extruded from a plurality of plastic materials.

BACKGROUND INFORMATION

U.S. Pat. No. 5,301,798, granted Apr. 12, 1994, to A. L. Wilkens, discloses extruded thermoplastic floor slats that fit down over thermoplastic resin slide bearings which are attached to guide beams. The material from which the floor slats are made is apparently homogenous throughout the structure of the slats. U.S. Pat. No. 4,896,761, granted Jan. 30, 1990, to the present applicant, discloses a metal floor slat that snaps down onto a plastic bearing which is installed on a guide beam. The slat has a side groove which receives and retains an inboard base portion of an elongated seal strip. The outboard end of the seal strip engages the side of an adjacent floor slat. U.S. Pat. No. 4,984,679, granted Jan. 15, 1991, to the present applicant, discloses an arrangement similar to U.S. Pat. No. 4,896,761 with the additional feature of a two-material seal strip. The inboard portion of the seal strip is relatively resilient and provides a cushion backing. The outboard portion that engages the side of the adjacent slat is formed from a plastic material that is relatively hard and has a relatively low coefficient of friction. The patent also discloses a co-extrusion procedure for making the two-material seal strip.

SUMMARY OF THE INVENTION

A subject of the invention is a floor slat for use in a reciprocating slat conveyor of the type having a plurality of adjacent floor slats mounted on guide beams to be selectively reciprocated relative to the beams. According to an aspect of the invention, the slat comprises an integrally formed plastic body including a top portion and first and second opposite side portions depending downwardly from the top portion. The top portion has an upper surface portion and an abrasion resistant lower bearing surface. The upper surface portion is reinforced to carry loads imposed by material to be conveyed by the conveyor. The lower bearing surface is positioned to contact an upper surface of a guide beam to directly and slidably support the slat on the beam.

Preferably, the first side portion has a laterally outwardly facing engagement portion, and the second side portion has an abrasion resistant laterally outwardly facing side bearing surface. The slat includes a seal carried by the engagement portion and positioned to slidably contact the side bearing surface of an adjacent floor slat.

The slat may be integrally formed by co-extruding a plurality of plastic materials. For example, the body, including the upper surface portion, the lower bearing surface, and the side bearing surface, may be co-extruded. Preferably, the engagement portion of the first side portion is formed by the co-extrusion procedure. The slat may also include lower flange portions extending inwardly toward each other from lower end portions of the side portions to engage a guide beam when the floor slat is snapped down onto the guide beam. These flange portions are preferably integrally formed along with the other portions of the body. The load-carrying upper surface portion may advantageously be formed from polyvinylchloride with reinforcing glass fibers.

In a first embodiment of the invention, the upper surface portion comprises an upper layer of reinforced plastic material, and each of the lower and side bearing surfaces comprises a layer of abrasion resistant plastic material. In order to promote bonding between the abrasion resistant layers and the remainder of the floor slat body, the body may include an intermediate layer of plastic material that is bonded to and positioned inwardly of each layer of abrasion resistant plastic material. The body, excluding the layers of abrasion resistant plastic material and the intermediate layers, is formed of a different plastic material that is bonded to the intermediate layers. Preferably, at least the load-carrying upper surface portion includes reinforcing fibers. The intermediate layers may be co-extruded with the abrasion resistant layers and the other parts of the body.

In another embodiment of the invention, the floor slat body comprises a main portion that includes the upper surface portion and the engagement portion and has a lower recess and a side recess. The lower and side bearing surfaces comprise strips of abrasion resistant plastic material bonded into the lower and side recesses, respectively. The main portion and the bearing strips may be integrally formed by co-extruding a plurality of plastic materials. Preferably, the main portion of the body comprises fiber reinforced plastic.

Another subject of the invention is a combination for use in a reciprocating slat conveyor of the type having a plurality of adjacent floor slats mounted on guide beams to be selectively reciprocated relative to the beams. According to an aspect of the invention, the combination comprises a guide beam and a floor slat. The guide beam has laterally opposite downwardly facing abutment surfaces. The slat has the basic characteristics of the floor slat described above. It also has an integrally formed plastic body that includes lower flange portions extending inwardly toward each other from lower end portions of the side portions to engage the abutment surfaces of the guide beam when the floor slat is snapped down onto the guide beam. This prevents subsequent upward movement of the slat relative to the beam. The side portions are sufficiently flexible to permit the slat to be snapped down onto the beam and the flanges to be positioned under the abutment surfaces. The slat and the combination may also have one or more of the other optional or preferred features discussed above.

A major advantage of the invention is that it enables the number of parts in the conveyor to be reduced without reducing the quality of the performance of the conveyor. By use of the invention, the bearings conventionally positioned between the floor slats and the guide beams can be eliminated since the floor slats themselves carry bearing surfaces for supporting the slats on the guide beams.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figures 1, 2:
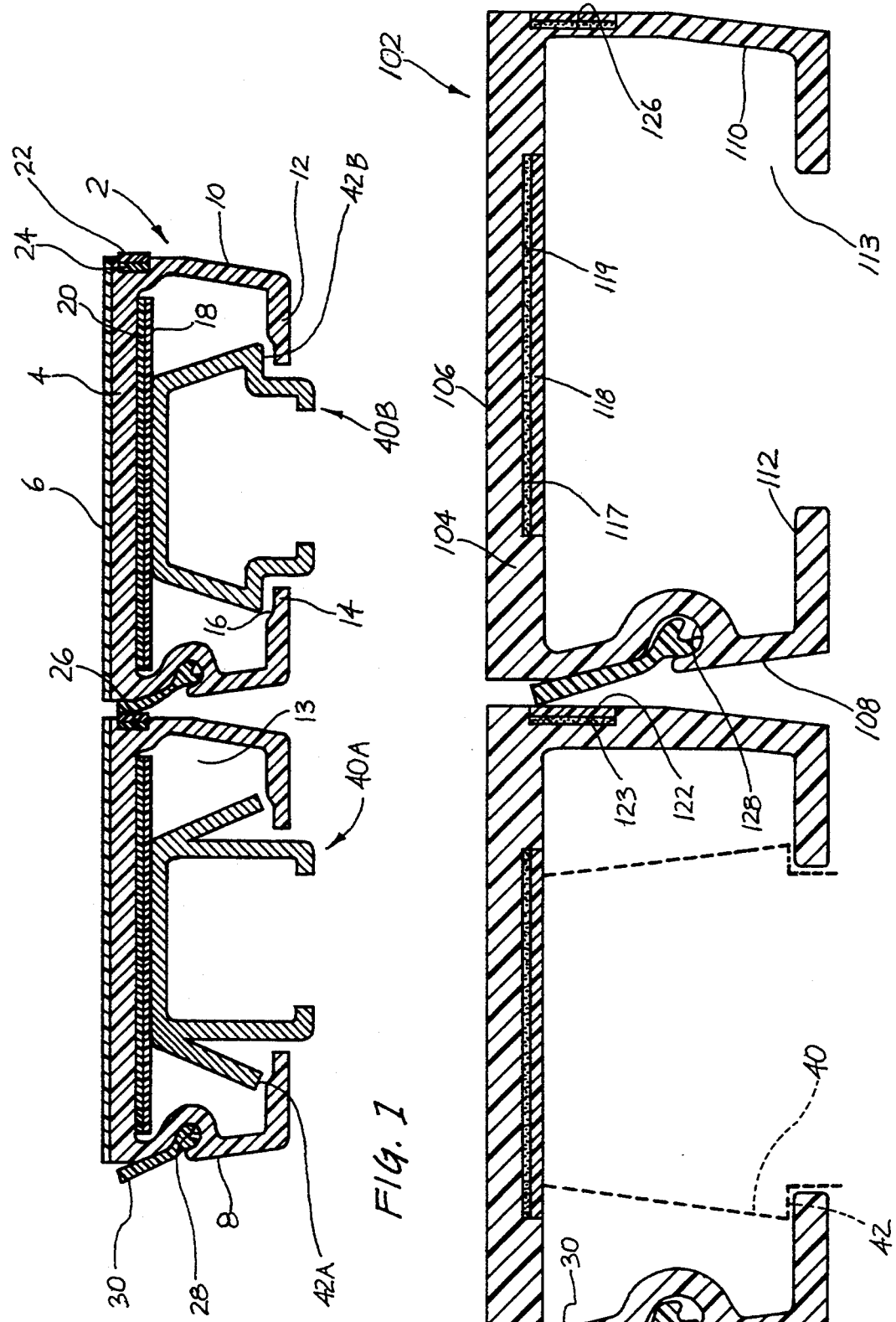
FIG. 1 is a sectional view illustrating a first embodiment of the floor slat of the invention and two alternative configurations of the guide beam.
FIG. 2 is a sectional view of two floor slats made in accordance with a second embodiment of the invention, with the guide beams omitted except for a schematic broken-line representation of one guide beam.

The drawings show two embodiments 2, 102 of the floor slat and two embodiments 40A, 40B of the guide beam that are constructed according to the invention and that constitute the best modes for carrying out the invention currently known to the inventor. FIG. 2 shows in broken lines a generalized outline of a guide beam 40.

The slat and slat/guide beam combination of the invention are intended for use in a reciprocating slat conveyor of the type having a plurality of adjacent floor slats mounted on guide beams to be selectively reciprocated relative to the beams and to each other. The typical manner in which the slats are moved first sequentially and then simultaneously to convey a load is known and is described in my U.S. Pat. No. 5,193,661. In a typical installation, the conveyor includes a frame to which the guide beams are fixedly secured to support and guide the reciprocating floor members.

Referring to FIG. 1, the first illustrated embodiment of the slat 2 comprises an integrally formed elongated plastic body including a top portion 4 and first and second opposite side portions 8, 10 depending downwardly from the top portion 4. Lower flanges 12 extend laterally inwardly toward each other from the lower ends of the side portions 8, 10. Together, the top portion 4, side portions 8, 10, and flanges 12 form a channel 13 for receiving a guide beam.

Both the floor slat in itself and the floor slat in combination with the guide beam are subjects of the invention. The guide beam may take various forms. FIG. 1 illustrates two beam cross sections that are currently being considered for use in the invention. Although FIG. 1 illustrates two different guide beams supporting side-by-side floor slats 2, in most installations, all the guide beams would have the same shape. Referring to the left-hand portion of FIG. 1, the guide beam 40A shown therein has a substantially square main portion with two opposite wings extending downwardly and laterally outwardly from the upper corners of the main portion. The bottom ends of the wings form abutment surfaces 42A. The bottom wall of the main portion of the beam 40A may be open, as shown in FIG. 1. Referring to the right-hand portion of FIG. 1, the guide beam 40B shown therein has, instead of the wings shown in the left-hand portion, opposite downwardly-facing shoulders that form the abutment surfaces 42B. Both guide beams 40A, 40B are made from a strong hard material, preferably metal.

In each case, the purpose of the abutment surface 42A, 42B is to provide a surface for engaging the adjacent flange 12 of a slat 2 mounted on the guide beam 40A, 40B to prevent upward movement of the slat 2 relative to the beam 40A, 40B once the slat 2 has been installed on the beam 40A, 40B. Preferably, the sides 8, 10 of the slat 2 are sufficiently flexible to permit the slat 2 to be snapped down onto the beam 40A, 40B to position the flanges 12 under the abutment surfaces 42A, 42B. As shown in FIG. 1, each flange 12 has an outer reduced thickness end 14 and a cam surface 16 for facilitating installation of the slat 2 on the beam 40A, 40B.

The top portion 4 of the slat body has an upper surface portion 6 that is reinforced to carry loads imposed by material positioned on the slats 2 to be conveyed by the conveyor. The manner in which this portion 6 is reinforced may be varied. The upper surface portion 6 in FIG. 1 is represented as a separate layer to illustrate a situation in which the composition of the upper surface portion 6 is different from that of the adjacent material of the slat body. For example, the slat body may be formed from a plastic such as polyvinylchloride, with only the upper layer or surface portion 6 reinforced with glass fibers. This construction results in an upper surface portion 6 of the slat 2 that is strong enough to support the loads imposed on it and highly resistant to wear caused by movement of the conveyed material on the slat 2. The upper surface portion 6 may be flat, as shown, or may have a ribbed or ridged configuration or various other known configurations. As used herein, the term "material" used in reference to what is being conveyed by the conveyor is intended to have a broad meaning and is intended to encompass various types of loads, including loads of relatively large discrete items, particulate loads, and mixed loads such as garbage.

An important feature of the invention is the bearing surfaces that are integrated into the body of the floor slat 2. The top portion 4 of the slat 2 has a lower bearing surface 18 that is made from an abrasion resistant material and is positioned to contact an upper surface of the guide beam 40A, 40B to directly and slidably support the slat 2 on the beam 40A, 40B, as shown in FIG. 1. The lower bearing shown in FIG. 1 is a separate layer 18. The downwardly facing surface of the layer 18 engages the guide beam 40A, 40B. The opposite upwardly facing surface is bonded to an intermediate layer 20, which is in turn bonded to an adjacent downwardly facing surface of the top portion 4 of the slat 2. The adjacent downwardly facing surface and the slat body above it are made from a material different from both the material of the bearing layer 18 and the material of the intermediate layer 20. The interfaces may be flat, as shown in FIG. 1, or may have a ridged or other nonflat configuration. The arrangement of the intermediate layer 20 between the bearing layer 18 and the main material of the slat body provides greater flexibility in the choice of materials for the bearing layer 18 and the main portion of the body. It enables the use of a bearing material and a main body material that do not bond well to each other but that both bond well to the material of the intermediate layer 20.

The second side portion 10 of the slat body has an abrasion resistant laterally outwardly facing side bearing surface 22. As shown in FIG. 1, this surface is provided by a side bearing layer 22 bonded to the main part of the body by a means of an intermediate layer 24 in the same manner that the lower bearing layer 18 is bonded. Preferably, the intermediate layer 24 and at least a portion of the side bearing layer 22 are received into a recess 26 to help minimize the distance between adjacent slats. The opposite first side portion 8 of the slat body has a laterally outwardly facing engagement portion 28 for carrying a seal 30. As shown, the engagement portion 28 comprises a socket into which one end of the seal is received. The seal 30 may take various forms but is preferably generally of the type disclosed in my U.S. Pat. No. 4,896,761. The portion of the seal 30 that projects laterally outwardly and upwardly from the engagement socket 28 is positioned to slidably contact the side bearing surface 22 of the adjacent floor slat 2.

FIG. 2 shows a second embodiment of the floor slat 102. Like the first embodiment 2 shown in FIG. 1, this embodiment 102 has a top portion 104 with a reinforced upper surface portion 106, first and second side portions 108, 110, and opposite flanges 112 extending laterally inwardly toward each other from the lower ends of the sides 108, 110. These portions 104, 108,110, 112 of the slat 102 form a channel 113 for receiving a guide beam 40. The guide beam 40 has downwardly facing opposite abutment surfaces 42 for engaging the confronting upwardly facing surfaces of the flanges 112.

As illustrated in FIG. 2, the upper surface portion 106 is not a separate layer but rather is merely the most upward portion of the top portion 104 of the slat body. A recess 117 is formed extending into the lower surface of the top portion 104 for receiving the lower bearing. As shown, the lower bearing comprises a lower bearing strip 118 received into the recess 117 and secured therein by bonding. The bonding may be accomplished, for example, by an adhesive 119. The lower surface of the bearing strip 118 that engages the upper surface of the guide beam 40 is flush with the laterally adjacent lower surface of the main body portion. The side bearings are formed in a similar manner. The second side 110 of the slat 102 has a side recess 126 which receives a side bearing strip 122 that is bonded therein, such as by adhesive 123. The structure of the first side portion 108 is essentially the same as that shown in FIG. 1. The laterally outwardly facing engagement portion comprises an outwardly facing socket 128 which receives the seal 30.

The floor slat of the invention may be formed in various ways. At the present time, the most advantageous method of making the floor slat is to integrally form the body of the slat by co-extruding a plurality of plastic materials. Co-extrusion technology is known and is illustrated in my U.S. Pat. No. 4,984,679. The embodiment of the slat 2 shown in FIG. 1 is preferably formed by co-extruding all of the portions of the slat 2 other than the seal 30. Of the co-extruded portions, all but the upper surface portion 6, bearing layers 18, 22, and intermediate layers 20, 24, are extruded from the same material, which may be, for example, polyvinylchloride. In such case, the upper surface portion 6 would preferably be formed of polyvinylchloride reinforced with glass fibers.

In the case of the embodiment shown in FIG. 2, the main body portion, i.e. the body of the slat excluding the seals 30, the bearing strips 118, 122, and the adhesive layers 119,123, is extruded from the same material, which may be, for example, glass fiber reinforced polyvinylchloride. The bearing strips 118, 122 are formed separately and then are adhesively bonded into the recesses 117, 126.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. For use in a reciprocating slat conveyor of the type having a plurality of adjacent floor slats mounted on guide beams to be selectively reciprocated relative to said beams, a floor slat comprising:

an integrally formed plastic body including a top portion and first and second opposite side portions depending downwardly from said top portion; said top portion having an upper surface portion reinforced to carry loads imposed by material to be conveyed by the conveyor, and an abrasion resistant lower bearing surface positioned to contact an upper surface of a guide beam to directly and slidably support the slat on the beam; and said body being integrally formed from a plurality of plastic materials including a main body material and an abrasion resistant material that forms said lower bearing surface.

2. The floor slat of claim 1, wherein said body, including said upper surface portion and lower bearing surface, is integrally formed by co-extruding a plurality of plastic materials.

3. The floor slat of claim 1, wherein said upper surface portion comprises polyvinylchloride with reinforcing glass fibers.

4. The floor slat of claim 1, wherein said upper surface portion comprises an upper layer of reinforced plastic material, and said lower bearing surface comprises a layer of a different abrasion resistant plastic material.

5. The floor slat of claim 4, wherein said body, including said upper surface portion and lower bearing surface, is integrally formed by co-extruding a plurality of plastic materials.

6. The floor slat of claim 1, wherein said body comprises a main portion including said upper surface portion and having a lower recess, and said lower bearing surface comprises a strip of abrasion resistant plastic material bonded into said lower recess.

7. The floor slat of claim 6, wherein said main portion and said strip are integrally formed by co-extruding a plurality of plastic materials.

8. The floor slat of claim 6, wherein said main portion of said body comprises fiber reinforced plastic.

9. For use in a reciprocating slat conveyor of the type having a plurality of adjacent floor slats mounted on guide beams to be selectively reciprocated relative to said beams, a floor slat comprising:

an integrally formed plastic body including a top portion and first and second opposite side portions depending downwardly from said top portion; said top portion having an upper surface portion reinforced to carry loads imposed by material to be conveyed by the conveyor, and an abrasion resistant lower bearing surface positioned to contact an upper surface of a guide beam to directly and slidably support the slat on the beam;

wherein said upper surface portion comprises an upper layer of reinforced plastic material, and said lower bearing surface comprises a layer of abrasion resistant plastic material; and wherein said body includes an intermediate layer of plastic material that is bonded to and positioned inwardly of said layer of abrasion resistant plastic material; and said body, including said upper surface portion, intermediate layer, and lower bearing surface, is integrally formed by co-extruding a plurality of plastic materials.

10. For use in a reciprocating slat conveyor of the type having a plurality of adjacent floor slats mounted on guide beams to be selectively reciprocated relative to said beams, a floor slat comprising:

an integrally formed plastic body including a top portion and first and second opposite side portions depending downwardly from said top portion; said top portion having an upper surface portion reinforced to carry loads imposed by material to be conveyed by the conveyor, and an abrasion resistant lower bearing surface positioned to contact an upper surface of a guide beam to directly and slidably support the slat on the beam; said first side portion having a laterally outwardly facing engagement portion; said second side portion having an abrasion resistant laterally outwardly facing side bearing surface; and said body being integrally formed from a plurality of plastic materials including a main body material and an abrasion resistant material that forms said lower bearing surface; and a seal carried by said engagement portion and positioned to slidably contact said side bearing surface of an adjacent floor slat.

11. The floor slat of claim 10, wherein said body, including said upper surface portion, lower bearing surface, engagement portion, and side bearing surface, is integrally formed by co-extruding a plurality of plastic materials.

12. The floor slat of claim 10, wherein each of said lower bearing surface and said side bearing surface comprises a layer of abrasion resistant plastic material, and said upper surface portion comprises an upper layer of a different reinforced plastic material.

13. The floor slat of claim 12, wherein said body, including said upper surface portion, lower bearing surface, and side bearing surface, is integrally formed by co-extruding a plurality of plastic materials.

14. For use in a reciprocating slat conveyor of the type having a plurality of adjacent floor slats mounted on guide beams to be selectively reciprocated relative to said beams, a floor slat comprising:

an integrally formed plastic body including a top portion and first and second opposite side portions depending downwardly from said top portion; said top portion having an upper surface portion reinforced to carry loads imposed by material to be conveyed by the conveyor, and an abrasion resistant lower bearing surface positioned to contact an upper surface of a guide beam to directly and slidably support the slat on the beam; said first side portion having a laterally outwardly facing engagement portion; and said second side portion having an abrasion resistant laterally outwardly facing side bearing surface; and a seal carried by said engagement portion and positioned to slidably contact said side bearing surface of an adjacent floor slat;

wherein said upper surface portion comprises an upper layer of reinforced plastic material, and each of said lower bearing surface and said side bearing surface comprises a layer of abrasion resistant plastic material; and wherein said body includes an intermediate layer of plastic material that is bonded to and positioned inwardly of each said layer of abrasion resistant plastic material; said body, excluding said layers of abrasion resistant plastic material and said intermediate layers, is formed of a different plastic material that is bonded to said intermediate layers; and said upper surface portion includes reinforcing layers.

15. The floor slat of claim 14, wherein said body, including said upper surface portion, intermediate layers, lower bearing surface, and side bearing surface, is integrally formed by co-extruding a plurality of plastic materials.

16. For use in a reciprocating slat conveyor of the type having a plurality of adjacent floor slats mounted on guide beams to be selectively reciprocated relative to said beams, a combination comprising:

a guide beam having laterally opposite downwardly facing abutment surfaces; and a floor slat comprising an integrally formed plastic body including a top portion, first and second opposite side portions depending downwardly from said top portion, and lower flange portions extending inwardly toward each other from lower end portions of said side portions to engage said abutment surfaces of said guide beam when the floor slat is snapped down onto said guide beam and prevent subsequent upward movement of said slat relative to said beam; said top portion having an upper surface portion reinforced to carry loads imposed by material to be conveyed by the conveyor, and an abrasion resistant lower bearing surface positioned to contact an upper surface of said guide beam to directly and slidably support said slat on said beam; said side portions being sufficiently flexible to permit said slat to be snapped down onto said beam and said flanges positioned under said abutment surfaces;

in which said first side portion has a laterally outwardly facing engagement portion, and said second side portion has an abrasion resistant laterally outwardly facing side bearing surface; and which comprises a seal carried by said engagement portion and positioned to slidably contact said side bearing surface of an adjacent floor slat;

wherein said body comprises a main portion including said upper surface portion and said engagement portion and having a side recess, and said side bearing surface comprises a strip of abrasion resistant plastic material bonded into said side recess.

17. The combination of claim 16, wherein said main portion of said body includes a lower recess, and said lower bearing surface comprises a strip of abrasion resistant plastic material bonded into said lower recess.

18. For use in a reciprocating slat conveyor of the type having a plurality of adjacent floor slats mounted on guide beams to be selectively reciprocated relative to said beams, a combination comprising:

a guide beam having laterally opposite downwardly facing abutment surfaces; and a floor slat comprising an integrally formed plastic body including a top portion, first and second opposite side portions depending downwardly from said top portion, and lower flange portions extending inwardly toward each other from lower end portions of said side portions to engage said abutment surfaces of said guide beam when the floor slat is snapped down onto said guide beam and prevent subsequent upward movement of said slat relative to said beam; said top portion having an upper surface portion reinforced to carry loads imposed by material to be conveyed by the conveyor, and an abrasion resistant lower bearing surface positioned to contact an upper surface of said guide beam to directly and slidably support said slat on said beam; said side portions being sufficiently flexible to permit said slat to be snapped down onto said beam and said flanges positioned under said abutment surfaces; and said body being integrally formed from a plurality of plastic materials including a main body material and an abrasion resistant material that forms said lower bearing surface.

19. The combination of claim 18, in which said first side portion has a laterally outwardly facing engagement portion, and said second side portion has an abrasion resistant laterally outwardly facing side bearing surface; and which comprises a seal carried by said engagement portion and positioned to slidably contact said side bearing surface of an adjacent floor slat.

20. The combination of claim 19, wherein said body, including said upper surface portion, 2lower bearing surface, and side bearing surface, is integrally formed by co-extruding a plurality of plastic materials.

21. For use in a reciprocating slat conveyor of the type having a plurality of adjacent floor slats mounted on guide beams to be selectively reciprocated relative to said beams, a combination comprising:
   a guide beam having laterally opposite downwardly facing abutment surfaces; and
   a floor slat comprising an integrally formed plastic body including a top portion, first and second opposite side portions depending downwardly from said top portion, and lower flange portions extending inwardly toward each other from lower end portions of said side portions to engage said abutment surfaces of said guide beam when the floor slat is snapped down onto said guide beam and prevent subsequent upward movement of said slat relative to said beam; said top portion having an upper surface portion reinforced to carry loads imposed by material to be conveyed by the conveyor, and an abrasion resistant lower bearing surface positioned to contact an upper surface of said guide beam to directly and slidably support said slat on said beam; said side portions being sufficiently flexible to permit said slat to be snapped down onto said beam and said flanges positioned under said abutment surfaces;
   wherein said upper surface portion comprises an upper layer of reinforced plastic material, and said lower bearing surface comprises a layer of abrasion resistant plastic material; said body includes an intermediate layer of plastic material that is bonded to and positioned inwardly of said layer of abrasion resistant plastic material; and said body, including said upper surface portion, intermediate layer, and lower bearing surface, is integrally formed by co-extruding a plurality of plastic materials.

22. For use in a reciprocating slat conveyor of the type having a plurality of adjacent floor slats mounted on guide beams to be selectively reciprocated relative to said beams, a floor slat comprising:
   an integrally formed plastic body including a top portion and first and second opposite side portions depending downwardly from said top portion; said top portion having an upper surface portion reinforced to carry loads imposed by material to be conveyed by the conveyor, and an abrasion resistant lower bearing surface positioned to contact an upper surface of a guide beam to directly and slidably support the slat on the beam; said first side portion having a laterally outwardly facing engagement portion; and said second side portion having an abrasion resistant laterally outwardly facing side bearing surface; and a seal carried by said engagement portion and positioned to slidably contact said side bearing surface of an adjacent floor slat;
   wherein said body comprises a main portion including said upper surface portion and said engagement portion and having a side recess, and said side bearing surface comprises a strip of abrasion resistant plastic material bonded into said side recess.

23. The floor slat of claim 22, wherein said main portion of said body includes a lower recess, and said lower bearing surface comprises a strip of abrasion resistant plastic material bonded into said lower recess.

24. The floor slat of claim 23, wherein said main portion and said strips are integrally formed by co-extruding a plurality of plastic materials.

* * * * *

UNITED STATES PATENT AND TRADEMARK OFFICE
CERTIFICATE OF CORRECTION

PATENT NO: 5,447,222

DATED: September 5, 1995

INVENTOR(S): Raymond K. Foster

It is certified that error appears in the above-identified patent and that said Letters Patent is hereby corrected as shown below:

In claim 20, column 9, line 19, "2ower" should be -- lower --.

Signed and Sealed this

Third Day of December, 1996

Attest:

BRUCE LEHMAN

Attesting Officer

Commissioner of Patents and Trademarks